United States Patent [19]

Thöne et al.

[11] Patent Number: 5,382,418

[45] Date of Patent: Jan. 17, 1995

[54] PROCESS FOR REMOVING POLLUTANTS FROM COMBUSTION EXHAUST GASES

[75] Inventors: Bernd Thöne, Friedberg; Gerhard Schmidt, Karben; Erhard Herrmann, Leverkusen, all of Germany

[73] Assignee: Metallgesellschaft Aktiengesellschaft, Frankfurt am Main, Germany

[21] Appl. No.: 25,355

[22] Filed: Mar. 1, 1993

[30] Foreign Application Priority Data

Mar. 3, 1992 [DE] Germany ............... 4206602

[51] Int. Cl.6 ............... B01J 8/24; C01B 21/20
[52] U.S. Cl. ............... 423/239.1; 423/244.07
[58] Field of Search ............... 423/239, 239 A, 244.07, 423/239.1

[56] References Cited

U.S. PATENT DOCUMENTS

| | | | |
|---|---|---|---|
| 4,293,524 | 10/1981 | Teller et al. | 422/169 |
| 4,442,080 | 4/1984 | Donnelley et al. | 423/239.1 |
| 4,539,188 | 9/1985 | Hirsch et al. | 423/244.07 |
| 4,548,797 | 10/1985 | Sauer et al. | 423/244.07 |
| 4,670,237 | 6/1987 | Graf et al. | 423/244 |
| 4,810,478 | 3/1989 | Graf | 423/244.07 |
| 4,975,257 | 12/1990 | Lin | 423/244.07 |
| 5,158,754 | 10/1992 | Lefers et al. | 422/191 |

FOREIGN PATENT DOCUMENTS

| | | |
|---|---|---|
| 0114477 | 12/1983 | European Pat. Off. . |
| 0211458 | 10/1986 | European Pat. Off. . |
| 0228111 | 7/1987 | European Pat. Off. . |
| 3235559 | 4/1982 | Germany . |
| 3701527 | 8/1988 | Germany . |

*Primary Examiner*—Wayne Langel
*Attorney, Agent, or Firm*—Herbert Dubno

[57] ABSTRACT

At least one absorbent is added to the exhaust gas, which is passed at temperatures in the range from about 40° to 500° through a fluidized bed reactor and through dedusting means. Part of the solids separated in the dedusting means is recycled to the fluidized bed reactor. At least part of the recycled solids is blown with an entraining gas upwardly through a tube into the lower portion of the reactor. At least part of the combustion exhaust gas is fed to the reactor as a rising stream from a space which surrounds the tube. Air or combustion exhaust gas may be used, e.g., as an entraining gas.

1 Claim, 1 Drawing Sheet

PROCESS FOR REMOVING POLLUTANTS FROM COMBUSTION EXHAUST GASES

FIELD OF THE INVENTION

Our present invention relates to a process for removing pollutants and dust from a combustion exhaust gas, i.e. a flue gas. More particularly, the invention relates to a process in which at least one absorbent is added to the exhaust gas, which at temperatures in the range from about 40° to 500° C. is passed through a fluidized bed reactor and through dedusting means and part of the solids separated in the dedusting means is recycled to the fluidized bed reactor.

BACKGROUND OF THE INVENTION

A process for removing pollutants from flue gas by the addition of an absorbent thereto is described in European Patent 0 228 111 and in DE-A-3 701 527. In the process in accordance with the European patent the exhaust gas is mixed with a calcium-containing absorbent to bind sulfur oxides. In accordance with DE-A-3 701 527, $NH_3$ and a denitrating catalyst, which contains, inter alia, $FeSO_4$ on a carrier, are distributed in the exhaust gas in order to reduce $NO_x$ (nitrogen oxides).

OBJECTS OF THE INVENTION

It is an object of the invention to improve the known process and to ensure an effective distribution of the solids which have been recycled to the fluidized bed reactor.

Another object of the invention is to provide an improved process or method of removing pollutants from a flue gas whereby drawbacks of earlier systems are avoided.

Still another object of the invention is to provide an improved apparatus for carrying out the new method and, more particularly, to provide an improved fluidized bed reactor for this purpose.

SUMMARY OF THE INVENTION

In the process described previously these objects are attained in accordance with the invention in that at least part of the solids to be recycled to the fluidized bed reactor are blown upwardly with an entraining gas through a tube into the lower portion of the reactor and at least part of the combustion exhaust gas is fed to the reactor as a rising stream from a space surrounding that tube.

The entraining gas causes the solids to enter the fluidized bed in the desired region and to be entrained and distributed as uniformly as possible by the combustion gas.

As a result, the chemical reactions by which the nitrogen oxides are reduced are accelerated. The tube is preferably centrally disposed in the lower portion of the reactor.

The entraining gas may be selected from various gases, such as inert gas or air. Alternatively, the entraining gas may consist of combustion exhaust gas, which may be untreated or dedusted.

Desulfurizing agents and/or denitrating agents may be supplied to the fluidized bed reactor as an absorbent. Desulfurizing agents include, e.g., NaOH or calcium-containing fine-grained substances like $Ca(OH)_2$ or CaO. For removing nitrogen oxides or $NO_x$, for example $NH_3$ may be used in conjunction with a granular catalyst, such as iron sulfate.

The invention provides also a fluidized bed reactor for reducing nitrogen oxides, which are supplied to the reactor with a combustion exhaust gas. The lower portion of the reactor is supplied with a reducing agent and with solids which have been discharged from the reactor and are being recycled. That reactor contains in its lower portion a rising tube, which is connected to a line for supplying solids and an entraining gas.

More particularly, these objects are attained in a process for removing pollutants from a flue gas which comprises the steps of:

(a) admixing with at least part of the exhaust gas, at least one absorbent for pollutants therein;

(b) feeding at least a portion of the exhaust gas into a fluidized bed reactor through an annular space surrounding an upright tube at a bottom of the reactor at a temperature in a range of about 40° to 500° C.;

(c) reacting the exhaust gas with said absorbent in said fluidized bed reactor;

(d) withdrawing gas with entrained solids from the fluidized bed reactor;

(e) dedusting the gas withdrawn in step (d) with the entrained solids and separating the entrained solids from the withdrawn gas; and (f) recycling at least part of the solids separated in step (e) to the fluidized bed reactor by blowing the part of the separated entrained solids into the bottom of the reactor through the tube in an entraining gas.

An apparatus or practicing the invention can comprise:

means for admixing with a least part of the exhaust gas, at least one absorbent for pollutants therein;

an upright fluidized bed reactor formed at a bottom thereof with an upright tube surrounded by an annular space and opening upwardly into the fluidized bed reactor;

means connected with the fluidized bed reactor for feeding at least a portion of said exhaust gas into the fluidized bed reactor through the annular space at a temperature in a range of about 40° to 500° C. whereby the exhaust gas is reacted with the absorbent in the fluidized bed reactor;

means for withdrawing gas with entrained solids from the fluidized bed reactor;

dedusting means connected with the means for withdrawing for dedusting the withdrawn gas with the entrained solids and separating the entrained solids from the withdrawn gas; and means connected with the dedusting means and with the tube for recycling at least part of the separated solids to the fluidized bed reactor by blowing the part of the separated entrained solids into the bottom of the reactor through the tube in an entraining gas.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
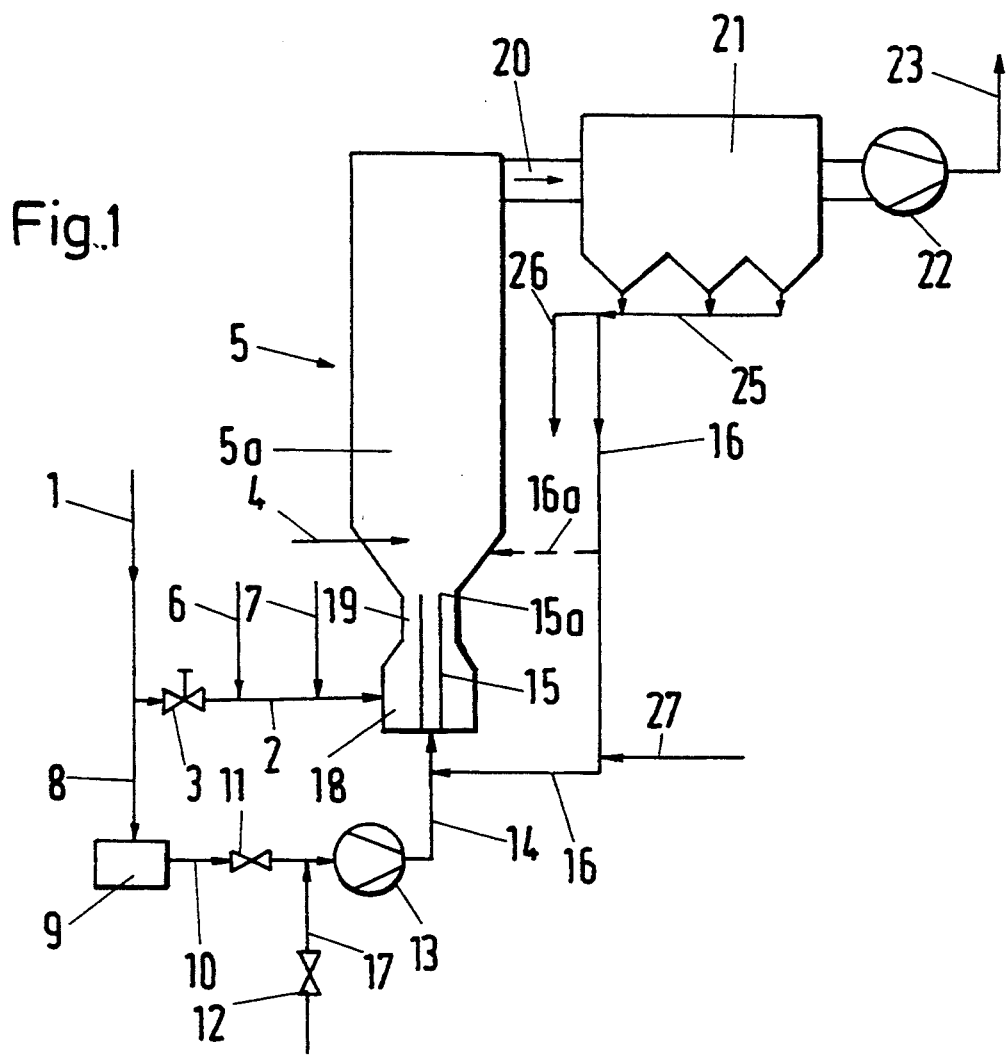
FIG. 1 is a flow diagram of the process in which the fluidized bed reactor is schematically shown.

The combustion exhaust gas or flue gas comes, e.g., from fuel-firing means, in which coal, gas or fuel oil is fired, and in accordance with FIG. 1 that exhaust gas is supplied in line 1. The exhaust gas may have partly been cooled and is at a temperature in the range from 40° to 600° C. and preferably not in excess of 500° C.

The exhaust gas is divided into a main stream and a remaining stream. The main stream is fed to a fluidized bed reactor 5 through a line 2 provided with a flow control valve 3. The ratio of the flow rates of the main stream (line 2) and the remaining stream (line 8) is in most cases from 10:1 to 100:1.

If it is desired to remove $NO_x$, the gas flowing in line 2 is supplied via line 6 with a denitrating catalyst and via line 7 in a controlled proportion with $NH_3$ for reducing the nitrogen oxides. About 0.8 to 1.5 mols of $NH_3$ are usually admixed per mole of $NO_x$ in the exhaust gas. Iron sulfate, e.g., is used in known manner as a denitrating catalyst, which is preferably added to the exhaust gas as a powder.

In case of need that part of the combustion exhaust gas which is branched off in line 8 is initially subjected to a coarse dedusting in a separator 9, which may consist, e.g., of a cyclone or cloth filter. While the shut-off valve 12 is closed, the gas is then supplied through line 10 and the opened flap valve 11 to a fan or blower 13, which blows the gas through the line 14 into a tube or riser 15. The separator 9 serves to protect the fan 13 from an excessive wear by coarse dust particles.

The exhaust gas in line 14 is supplied via line 16 with fine-grained solids, which are blown into the reactor 5 by the exhaust gas. A fine-grained desulfurizing agent, such as $Ca(OH)_2$ or $CaO$, is supplied through line 27 to the solids in line 16. The vertical tube 15 is centrally disposed in the lower portion of the fluidized bed reactor 5 and is surrounded by an entrance chamber 18, which is supplied with the exhaust gas via line 2.

The annular space 19 is constricted adjacent to the mouth 15a of the tube 15 disposed below the lower end of the enlarged portion of the fluidized bed reactor 5. If it is desired to desulfurize at temperatures below 100° C., it is advisable to inject water through the line 4 into the reactor 4. The flow cross section of chamber 18 around the constant cross section tube 15 is less than that of the fluidized bed reactor above the tube 15, but greater than that of the constriction 19.

Exhaust gas, $NH_3$ and denitrating catalyst and from the tube 15 an entraining gas and entrained solids, which contain desulfurizing agent, are mixed in the fluidized region 5a of the reactor 5. As a result, the nitrogen oxides are reacted with $NH_3$ to form $N_2$ and water and the $SO_2$ and $SO_3$ combine with the desulfurizing agent. Gas velocities and solids concentrations such as are known from circulating fluidized beds are found in the fluidizing region 5a. In that region the temperatures lie in the range from 40° to 500° C.

Alternatively, the entraining gas may consist of a different gas, such as dedusted exhaust gas or air. Such gas is supplied through line 17 and the opened shut-off valve 12 to the fan 13 whereas the flap valve 11 is closed. In that case the exhaust gas in line 1 is entirely supplied in line 2 to the reactor 5.

The solids-containing exhaust gas leaves the reactor 5 through the duct 20 and enters dedusting means 21, such as an electrostatic precipitator. A bag filter for instance, may alternatively be used as dedusting means.

Treated exhaust gas is sucked from the dedusting means 21 by a fan 22 and is discharged through the chimney 23.

The solids separated in the dedusting means 21 first enter a collecting manifold 25 and are recycled in part through line 16 to the reactor 5. Part of the solids is removed via line 26 from the process.

If it is not desired to blow through the tube 15 all solids to be recycled to the reactor 5, part of the solids may be introduced through the line 16a, which is represented by a broken line. This will not change the desirable distribution of the solids or will make only a minor change therein.

Figure 2:
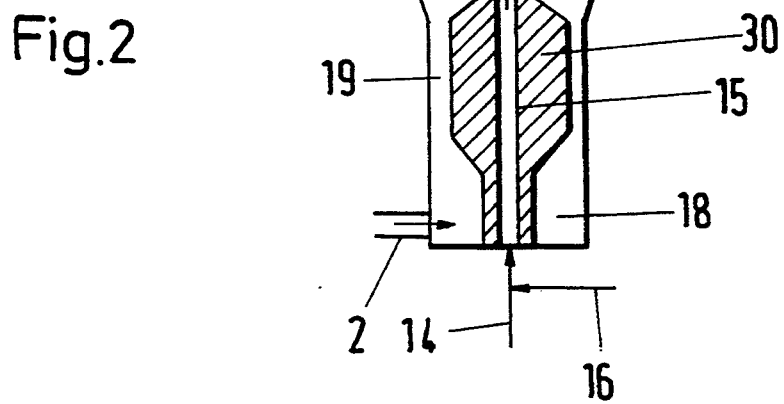
FIG. 2 illustrates another embodiment of the lower portion of the fluidized bed reactor.

In the modified embodiment shown in FIG. 2 the lower portion of the fluidized bed reactor 4 is provided with a displacing body 30, which surrounds the tube 15 and provides a larger distance between the annular space 19 and the tube 15. This may afford the advantage that the inside surface of the reactor 5 can be more intensely swept by rising combustion exhaust gas. The remaining reference characters have the meanings explained herein before with reference to FIG. 1. The body 30 provides the constriction with a constant outer diameter of the wall surrounding the chamber 18 and the constriction.

In the embodiments shown in FIGS. 1 and 2 in most cases the gas velocities in the annular space 19 are in the range from 30 to 90 m/sec and the gas velocities in the tube 15 are in the range from 2 to 30 m/sec.

EXAMPLES

Examples 1 and 2 deal with the purification of a flue gas, which is supplied in line 1 from a power plant at a rate of 760,000 $sm^3$ ($sm^3$=standard cubic meter or $m^3$STP). The flue gas is treated in a plant such as is shown in the drawing. The flue gas contains 0.6 g solids, particularly fly ash, per $sm^3$. The dedusting means 21 consist of an electrostatic precipitator, which comprises five fields and in which a dedusting by 99.992% is effected. 700,000 kg solids are recycled per hour through line 16. About 1.6% of the solids separated in the electrostatic precipitator are withdrawn through line 26.

EXAMPLE 1

A plant such as is shown in FIG. 1 is used as described above, but without the lines 6, 7, 16a, and 17. 98% of the flue gas flows through the line 2 and the remaining 2% serves as an entraining gas, which is dedusted by a cloth filter 9 and is supplied through line 14 and the tube 15 to the reactor 5. The flue gas contains 2000 mg $SO_2$ per $sm^3$. 46 g water per sm'flue gas are injected through line 4 and $Ca(OH)_2$ at a rate of 7800 kg/h is added via line 27. The temperatures in the reactor lie in the range from about 60° to 70° C. The purified flue gas discharged via line 23 still contains 50 mg dust and 180 mg $SO_2$ per $sm^3$.

EXAMPLE 2

The flue gas contains 1000 mg $NO_x$, 1800 mg $SO_2$ and 3 g dust per $sm^3$ and is to be desulfurized, denitrated and dedusted. The entire flue gas at a temperature of 420° C. is fed through line 2 to the reactor 5. Air as an entraining gas is supplied at a rate of 14,000 $sm^3$/h through lines 17 and 14. The lower portion of the reactor is provided with a displacing body 30, such as is shown in FIG. 2. 0.3 g iron sulfate, 0.31 mg $NH_3$ and 3.4 g $Ca(OH)_2$ are added per $sm^3$ of flue gas. The purified flue gas in line 23 still contains 100 mg $NO_x$, 120 mg $SO_2$ and 30 mg dust per $sm^3$.

We claim:

1. A process for removing pollutants and dust from a combustion exhaust gas, comprising the steps of
   (a) admixing with at least 90% of said exhaust gas, at least one absorbent for pollutants therein, said absorbent containing $NH_3$ and a granular denitrating catalyst;
   (b) feeding said absorbent containing exhaust gas into an entrance chamber annularly surrounding a lower portion of an upright tube, from said entrance chamber said absorbent containing exhaust gas being fed upwardly through an annular space surrounding said upright tube, said annular space forming a constriction for the gas flow and the gas velocity in upward direction in said annular space being higher than in said entrance chamber, from said annular space feeding said absorbent containing exhaust gas into a lower portion of a fluidized bed, said fluidized bed being disposed in a fluidized bed reactor, temperatures in said fluidized bed being in the range of about 40° to 500° C., said fluidized bed being disposed above said upright tube;
   (c) reacting said exhaust gas with said absorbent in said fluidized bed above said tube;
   (d) withdrawing gas with entrained solids from said fluidized bed reactor;
   (e) dedusting the gas from said reactor in at least one dedusting means and separating entrained solids from the dedusted gas; and
   (f) recycling a portion of the solids separated in step (e) to said fluidized bed rector by blowing at least part of said portion of the solids into said bottom of said fluidized bed through said tube in an entraining gas, said entraining gas being selected from the group which consists of a portion of exhaust gas, a portion of said dedusted gas, inert gas and air.

* * * * *